(12) United States Patent
Danilak et al.

(10) Patent No.: US 9,547,554 B2
(45) Date of Patent: Jan. 17, 2017

(54) MASS STORAGE DEVICE AND METHOD OF OPERATING THE SAME TO STORE PARITY DATA

(71) Applicant: Skyera, LLC., San Jose, CA (US)

(72) Inventors: Radoslav Danilak, Cupertino, CA (US); Guiqiang Dong, San Jose, CA (US); Ladislav Steffko, San Ramon, CA (US)

(73) Assignee: Skyera, LLC, San Jose, CA (US)

( * ) Notice: Subject to any disclaimer, the term of this patent is extended or adjusted under 35 U.S.C. 154(b) by 104 days.

(21) Appl. No.: 14/210,009

(22) Filed: Mar. 13, 2014

(65) Prior Publication Data

US 2014/0281691 A1  Sep. 18, 2014

Related U.S. Application Data

(60) Provisional application No. 61/793,591, filed on Mar. 15, 2013.

(51) Int. Cl.
*G06F 11/00* (2006.01)
*G06F 11/10* (2006.01)

(52) U.S. Cl.
CPC .... *G06F 11/1092* (2013.01); *G06F 2211/1083* (2013.01)

(58) Field of Classification Search
CPC .................................................. G06F 15/1661
See application file for complete search history.

(56) References Cited

U.S. PATENT DOCUMENTS

| | | | | |
|---|---|---|---|---|
| 7,134,066 | B2* | 11/2006 | Hassner | G06F 11/1076 714/766 |
| 7,565,488 | B2* | 7/2009 | Fujie | G06F 3/0626 711/114 |
| 8,386,838 | B1* | 2/2013 | Byan | G06F 11/1484 714/5.11 |
| 8,578,090 | B1* | 11/2013 | Jernigan, IV | G06F 3/0607 711/114 |
| 9,043,545 | B2* | 5/2015 | Kimmel | G06F 3/0605 711/114 |
| 9,075,710 | B2* | 7/2015 | Talagala | G06F 12/0246 |
| 2005/0086575 | A1* | 4/2005 | Hassner | G06F 11/1076 714/766 |
| 2005/0102557 | A1* | 5/2005 | Davies | G06F 11/2005 714/11 |
| 2006/0184731 | A1* | 8/2006 | Corbett | G06F 3/0607 711/114 |
| 2006/0248378 | A1* | 11/2006 | Grcanac | G06F 11/1076 714/6.12 |
| 2007/0094531 | A1* | 4/2007 | Ni | G06F 1/187 714/4.1 |
| 2008/0126715 | A1* | 5/2008 | Fujie | G06F 3/0626 711/154 |

(Continued)

*Primary Examiner* — Christopher McCarthy
(74) *Attorney, Agent, or Firm* — Wilmer Cutler Pickering Hale and Dorr LLP (57) ABSTRACT

A mass storage memory device is disclosed. The device includes a plurality of blades where two blades are used to store parity data corresponding to data stored in the other blades. The device also includes a controller configured to write data to the blades along stripes extending from the other blades to the two blades, where the parity data within a stripe is based on the data written to the other blades in the stripe, and wherein the parity data includes two or more types of parity data.

20 Claims, 4 Drawing Sheets

(56) References Cited

U.S. PATENT DOCUMENTS

| | | | |
|---|---|---|---|
| 2012/0173932 A1* | 7/2012 | Li | G06F 11/1076 714/42 |
| 2014/0281315 A1* | 9/2014 | Danilak | G06F 11/1456 711/162 |
| 2015/0212911 A1* | 7/2015 | Nolterieke | G06F 3/061 714/6.23 |

* cited by examiner

MASS STORAGE DEVICE AND METHOD OF OPERATING THE SAME TO STORE PARITY DATA

REFERENCES TO RELATED APPLICATIONS

This application claims the benefit of U.S. Provisional Application No. 61/793,591 filed Mar. 15, 2013, which is hereby incorporated in its entirety and for all purposes.

FIELD OF THE INVENTION

The present invention relates, generally, to mass storage devices and, more particularly, to methods of storing and recovering redundant data, and systems implementing the methods.

BACKGROUND OF THE INVENTION

Mass storage systems are used to store large amounts of data. Important parameters of such devices include speed and reliability. The systems preferably operate without error for long uninterrupted periods of time. To accomplish this, the systems store system data in addition to user data. The system data may be used to recover user data which is lost because of, for example, a power failure or a hardware failure.

Some systems use RAID (redundant array of independent disks) technology. RAID technology uses multiple memory components to form a single logical memory storage unit. The stored data is distributed among the memory components, and includes the system data for data recovery. Depending upon what level of RAID technology is used, the system may be able to recover from multiple errors. For example, RAID technology allows for recovery from multiple errors. For example, RAID6 technology allows for recovery from two errors.

SUMMARY OF THE INVENTION

One implementation is a mass storage device, including a plurality of blades, where two of the blades are configured to store parity data and the other blades are configured to store data written to the device. The device also includes a controller configured to write data to the blades along stripes extending from the other blades to the two blades, and to write parity data to the two blades, where the parity data within a stripe is based on the data written to the other blades in the stripe, and where the parity data includes two types of parity data.

One inventive aspect is a mass storage device. The device includes a plurality of blades, where two of the blades are configured to store parity data and the other blades are configured to store data written to the device. The device also includes a controller configured to write data to the blades along stripes extending from the other blades to the two blades, and to write parity data to the two blades. The parity data within a stripe is based on the data written to the other blades in the stripe, and where the parity data includes two types of parity data.

Another inventive aspect is a method of writing data to a mass storage device having a plurality of blades, where each blade includes a plurality of pages. The method includes receiving data to be stored, writing data corresponding to the received data along a stripe of the mass storage device to a first subset of the blades, and calculating first and second types of parity data, where the parity data is calculated based on the written data. The method also includes writing the first and second types of calculated parity data along the stripe to a second subset of the blades.

Another inventive aspect is a method of operating a mass storage device having a plurality of blades. The method includes receiving an indication that one of the blades has failed, receiving an instruction to access data located on the failed blade, recovering data of the failed blade, and executing the instruction using the recovered data.

Another inventive aspect is a method of operating a mass storage device having a plurality of blades and a controller. The method includes the controller operating the device with all of the blades, the controller receiving an indication that one of the blades has failed, and the controller operating the device with the non-failing blades. The method also includes the controller receiving an indication that the failed blade has been replaced, and the controller operating the device with all of the blades.

Another inventive aspect is a method of operating a mass storage device having a plurality of blades. The method includes determining an age of the device, and selecting an error recovery method based on the age of the device, wherein the selected error recovery method is selected from the group consisting of ECC, RAID, and bad column mapping.

Another inventive aspect is a method of operating a mass storage device having a plurality of blades. The method includes operating the device with all of the blades, receiving an indication that one of the blades is at least partially unavailable, operating the device with the available blades, and recovering data of the unavailable blade based on data stored in the available blades.

BRIEF DESCRIPTION OF THE DRAWINGS

The accompanying drawings, which are incorporated in and constitute a part of this specification, illustrate implementations of inventive concepts and, together with the description, serve to explain various advantages and principles of the invention.

DETAILED DESCRIPTION OF THE INVENTION

Reference is made to implementations illustrated in the accompanying drawings. The same reference numbers are generally used throughout the drawings and the following description to refer to the same or like parts.

Figure 1:
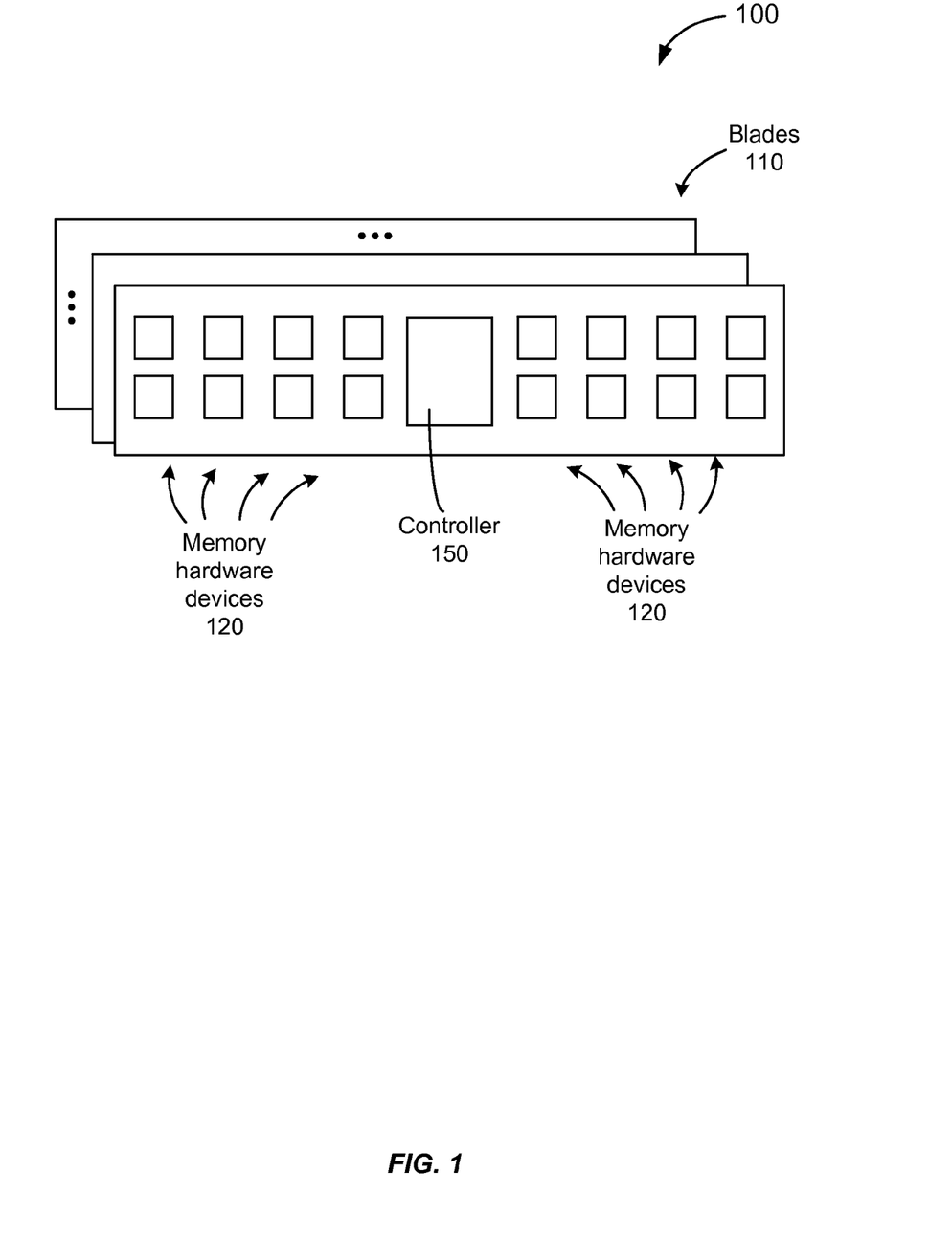
FIG. 1 is a block diagram illustrating a mass storage device.

FIG. 1 is a block diagram illustrating a mass storage device 100. In some implementations, the mass storage device 100 includes SLC (single level cell) NAND flash memory technology. The device 100 may additionally or alternatively include one or more of MLC (multilevel cell), NOR, PCM, Spin-Torque, MRAM, Memsistors, or other technologies.

As shown, the mass storage device 100 includes multiple blades 110, where each of the blades 110 includes a controller 150 and multiple memory hardware devices 120. In some implementations, memory hardware devices 120 are located on both front and back surfaces of each of the blades

110. The mass storage device 100 may also include a system controller (not shown) configured to cause the mass storage device 100 to perform the operations and actions described herein.

As an example, the mass storage device 100 may include 24 blades 110, and each of the blades 110 may include 32 memory hardware devices 120. Each of the memory hardware devices 120 may include 64 GB of storage capacity. In such an implementation, each of the blades 110 has 2 TB of memory storage capacity, and the mass storage device 100 has 48 TB of memory storage capacity. The mass storage device 100 also includes a controller 150, which is configured to control the read, write, and erase operations of the mass storage device 100. In some implementations, the number of blades 110, the number of memory hardware devices 120 on each blade 110, and/or the amount of storage capacity included in each of the memory hardware devices 120 may be different.

Figure 2:
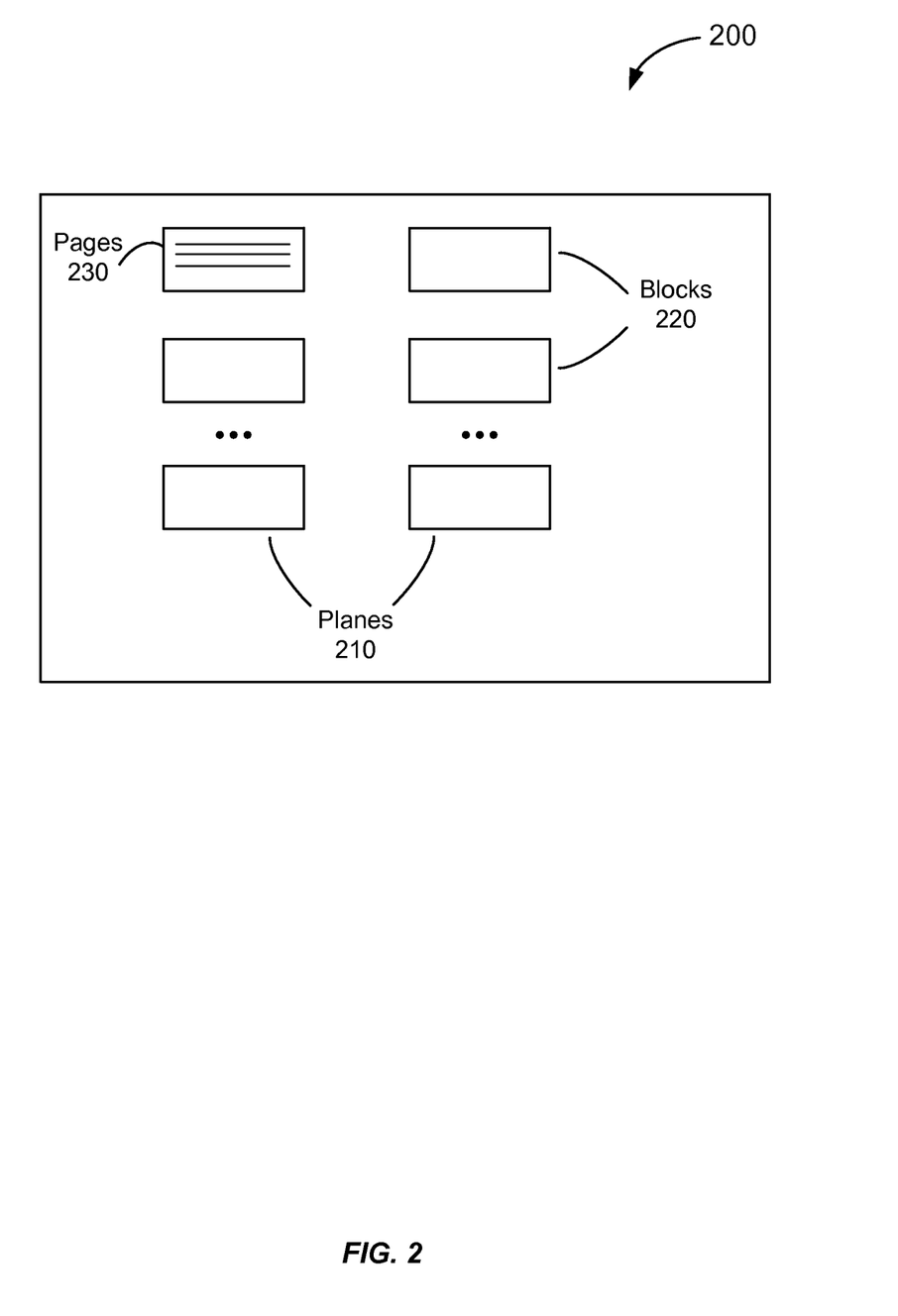
FIG. 2 is a schematic diagram illustrating a single die.

In some implementations, each of the memory hardware devices 120 includes multiple die. For example, each of the memory hardware devices 120 may include four die. FIG. 2 is a schematic diagram illustrating a single die 200. As shown, the die 200 includes two planes 210, where each of the planes includes multiple blocks 220, and each of the blocks 220 includes multiple pages 230. In addition, each of the pages 230 includes multiple memory cell locations.

As an example, each of the pages 230 may include 128K bits (or memory cell locations). Furthermore, each of the blocks may include 256 pages 230, and each of the planes 210 may include $2^{11}$ blocks 220. Such a die has a storage capacity of 16 GB. In some implementations, the number of planes 210, the number of blocks 220 in each plane 210, and/or the number of pages 230 in each block 220 may be different.

In some implementations, the planes 210 can be separately and simultaneously written, read, and erased. For some memory technologies, each time data is written to or read from the die, an entire page is written or read. For some memory technologies, each time data is erased an entire block of data is erased.

In some implementations, data written to the mass storage device 100 is written in stripes. A stripe includes one or more pages 230 from each of multiple blades 110. In some implementations, each stripe includes one or more pages 230 from all of the blades 110. For example, a stripe may include one page 230 from each plane 210 of one or more die 200 of each memory hardware device 120 on each of the blades 110.

In order to implement RAID technology in an n blade mass storage device where stripes extend across all of the blades, data may be written to n−2 of the blades along one of the stripes, and parity data based on the data written to the n−2 blades may be written along the stripe in the last 2 blades. The parity data is written to the last 2 blades such that each bit of each page of the last 2 blades corresponds with the parity data of a set of corresponding bits of corresponding pages of the data written to the n−2 blades, where each set of corresponding bits includes one bit per blade.

In some implementations, one of the last 2 blades receives parity data of a first type and the other of the last 2 blades receives parity data of a second type. Various types of parity data may be used. For example, xor of the data written to the n−2 blades, and Reed Solomon parity data or square of xor parity data may be used.

In some implementations, the parity data for a stripe is calculated as each page or other portion of the stripe is written. Alternatively, the parity data for the data of the stripe in the n−2 blades may be calculated after the data is written to the n−2 blades.

In some implementations, the last 2 blades are not always the same 2 blades. Instead, which two blades are used for parity information changes. For example, a first two blades may be assigned for use as parity data storage for a first stripe, and a second two blades may be assigned for use as a data storage for a second stripe. This may be advantageous at least because the parity information is not read during normal operation, and distributing the parity data among all of the blades balances the read load across the blades.

In some implementations, the controller 150 on each of the blades 110 is configured to perform an error correction function. Each controller 150 is configured to detect, and attempt to correct data errors which have occurred on the blade 110 associated therewith. If an error has occurred which cannot be corrected by a controller 150, the mass storage device 100 may correct the error using the parity data stored in the last 2 blades 110 of the device 100. If a single error has occurred, the parity data of one of the 2 types of parity data, for example, the xor parity data, may be used to correct the error. If two errors have occurred, the parity data of both of the 2 types of parity data may be used to correct the errors.

In some systems, in order to implement RAID technology in an n blade mass storage device where stripes extend across all of the blades, data may be written to n−m of the blades along one of the stripes, and parity data based on the data written to the n−m blades may be written along the stripe in the last m blades, where m is three or more, such as RAID7 or RAID8 technology. The parity data is written to the last m blades such that each bit of each page of the last m blades corresponds with the parity data of a set of corresponding bits of corresponding pages of the data written to the n−m blades, where each set of corresponding bits includes one bit per blade.

In some implementations, each of the last m blades receives parity data of a different type. In some implementations, one or more of the last m blades receives parity data which is the same type as the parity data received by one or more others of the last m blades. Various types of parity data may be used. For example, xor of the data written to the n−m blades, and Reed Solomon parity data or square of xor parity data may be used.

In some implementations, the parity data for a stripe is calculated as each page or other portion of the stripe is written. Alternatively, the parity data for the data of the stripe in the n−m blades may be calculated after the data is written to the n−m blades.

In some implementations, the last m blades are not always the same m blades. Instead, which blades are used for parity information changes. For example, a first m blades may be assigned for use as parity data storage for a first stripe, and a second m blades may be assigned for use as a data storage for a second stripe. This may be advantageous at least because the parity information is not read during normal operation, and distributing the parity data among all of the blades balances the read load across the blades.

In some implementations, if an error has occurred which cannot be corrected by a controller 150, the mass storage device 100 may correct the error using the parity data stored in the last m blades 110 of the device 100. If a single error has occurred, the parity data of one of the m types of parity data, for example, the xor parity data, may be used to correct the error. Likewise, if two or more errors have occurred, the parity data of two or more types of parity data may be used to correct the errors.

In some circumstances, errors can be caused by the failure of a blade, causing the data stored on the blade to be lost. The blade failure may include a failure of the entire blade, or a failure of one or more portions of the blade. For example, a blade failure may include a failure of any of a plane, a block, a page, a die, a memory hardware device, a controller, and any other portion of a blade which renders the blade partially or wholly inoperative. The blade failure may additionally or alternatively include a circumstance in which any of a blade, a plane, a block, a page, a die, a memory hardware device, a controller, and any other portion of a blade which renders the blade partially or wholly unavailable. For example, when the system performs an operation, such as a reset, an erase, or programming operation, the blade or a portion of the blade may be occupied by the operation and therefore unavailable or inaccessible for, for example, a data read operation. In such circumstances, the effect of, for example, "replacing" the blade is achieved by the blade becoming available after the occupying operation has completed.

Conventionally, mass storage systems experiencing the failure of a blade must use data throughout the entire memory system to recover the lost data. Accordingly, to recover the lost data, all of the data stored in the memory is rebuilt. Such recovery is extremely time-consuming, and must be performed prior to the conventional mass storage system being operational following the failure.

In the mass storage device 100, because the parity information stored in the last 2 blades and is stored by stripe, data lost because of the failure of a blade can be recovered stripe by stripe. For example, using known techniques, which vary according to the type of parity used, data unavailable because of the failure of a blade may recovered by regenerating or calculating the unavailable data based on the parity bits and the data stored in the other blades of each stripe. For example, for each stripe, there may be 2 parity bits. To regenerate the data in a particular stripe of an unavailable blade, the unavailable data is calculated based on the data in the particular stripe of the remaining available blades and the 2 parity bits for the particular stripe.

Because the process of recovering the data of each stripe is sufficiently fast, the data lost because of the blade failure can be recovered as needed. For example, if a read operation is to be performed, and the location of the data to be read includes a page which has not been recovered, the system may then, in response to the read operation, recover the data of the lost page. In some instances, some pages may be erased before the data stored therein is needed. For such pages, the data is not needed and may not be recovered.

Further reducing the impact of a blade failure, in some implementations, the allocation of memory capacity to applications being served may be thinly provisioned. Thin provisioning allows for memory capacity which is been allocated, but not used, to be shared by multiple applications. For example, each of the applications using mass storage device 100 may be allocated an amount of storage capacity corresponding to need and type of application, where the total amount of capacity allocated to the applications is greater than the actual physical capacity of the mass storage device 100. For example, mass storage device 100 may have a total physical capacity of 44 TB, but the total of capacity allocated to the applications may be 100 TB.

In such thinly provisioned systems, the memory storage capacity for each application is virtually allocated thereto. Accordingly, physical sections of the mass storage device are not assigned to specific applications a priori, but instead, are assigned as they are used. With this allocation scheme, the data within the mass storage device for each application tends to become segmented and unorganized. To minimize this effect, part of the normal operation of a thinly provisioned device may be to move data from location to location in order to have the data stored in a more optimized configuration.

Because the normal operation of a thinly provisioned device includes rearranging and reorganizing data, the impact of a blade failure may be minimal. If such a blade failure occurs, the system may note that the failed blade is unavailable for writing and erasing, and may continue to operate normally. In some embodiments, if data is to be read from the failed blade, the lost data from the failed blade is regenerated using the parity bits as discussed above, and is rewritten elsewhere in the memory to a blade which is operational.

Likewise, once the failed blade is replaced with an operational blade, the system may note that the new blade is available for reading, writing, and erasing. Because the mass storage device 100 is configured to continue to operate despite having a failed blade and to continue to operate despite having a newly replaced blade, utilization time of the mass storage device 100 is maximized and performance is optimized.

Figure 3:
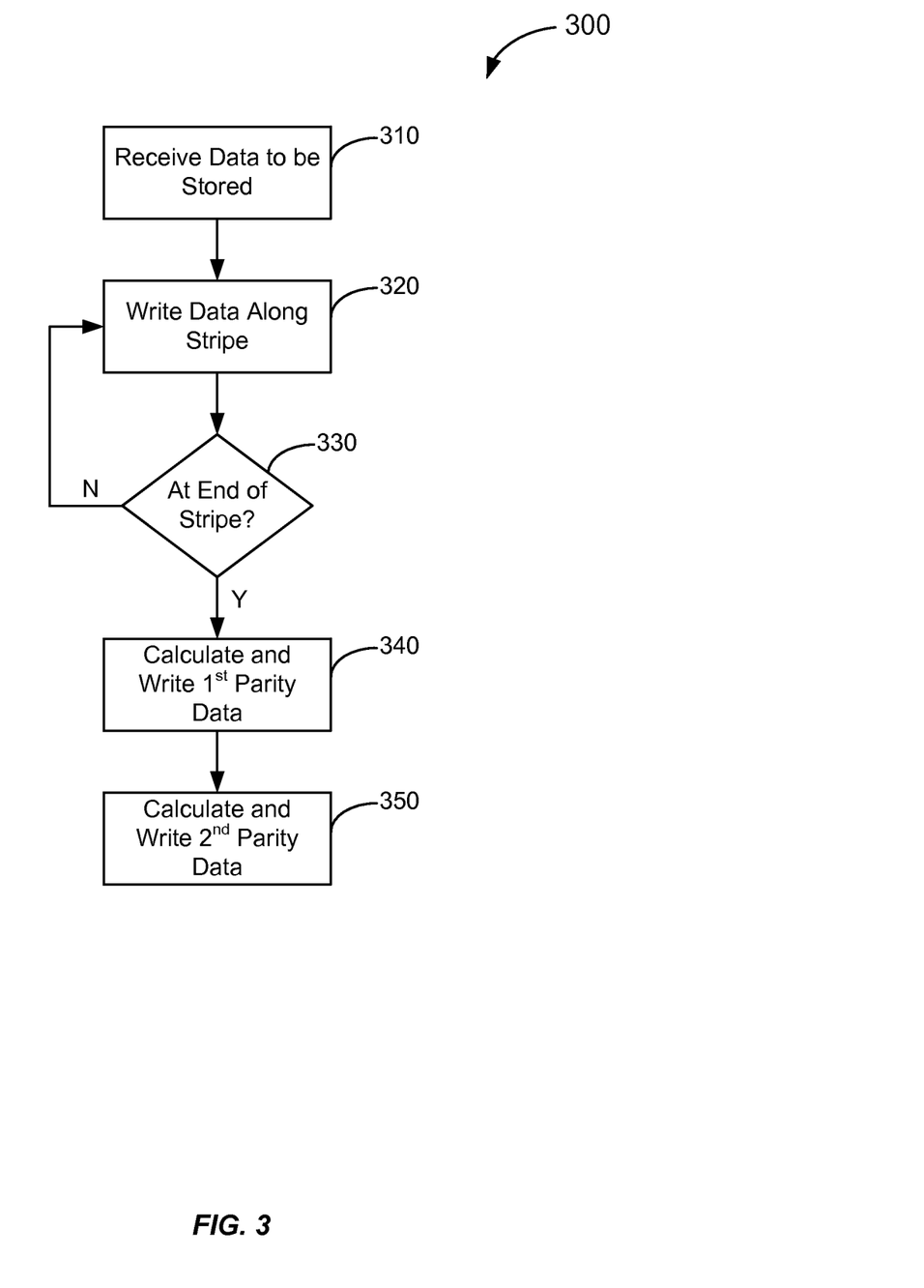
FIG. 3 is a flowchart diagram illustrating an implementation of a method of writing data to a mass storage device.

FIG. 3 is a flowchart diagram illustrating an implementation of a method of writing data to a mass storage device, such as the mass storage device 100. The mass storage device implements RAID technology to recover from errors. The mass storage device may be, for example, used by multiple applications simultaneously for storing and retrieving data related to the operation of the applications.

In step 310, data is received which is to be written to storage device 100. The data may be received from one of the applications in communication with the mass storage device 100. The data may be modified in preparation for storage. For example, the data may be rearranged or segmented so as to be written along a stripe of the mass storage device 100. In some embodiments, preparation for storage includes compressing the data.

In step 320, the data is written along a stripe extending across multiple blades configured for storage of application data. As the data is written, at step 330, a determination is made as to whether the previously written data was written to the last page of the last blade configured for storage of application data. If the previously written data was not written to the last page of the last blade configured for storage of application data, additional data is written in step 320. If the previously written data was written to the last blade configured for storage of application data, parity data is calculated and written in steps 340 and 350.

In step 340, parity data of a first type is calculated as discussed above. The parity data of the first type is stored along the same stripe as the data written in step 330 in one of two blades configured for storage of parity data. The first type of parity data may, for example, be xor data based on the data written in step 330.

In step 350, parity data of a second type is calculated as discussed above. The parity data of the second type is stored along the same stripe as the data written in step 330 in the other of the two blades configured for storage of parity data. The second type of parity data may, for example, be squared xor or Reed Solomon data based on the data written in step 330.

In systems which use additional parity bits, additional parity bits of the same or additional parity types are calculated and stored along the same stripe as the data written in step 330 to additional blades configured for storage of the additional parity bits.

Figure 4:
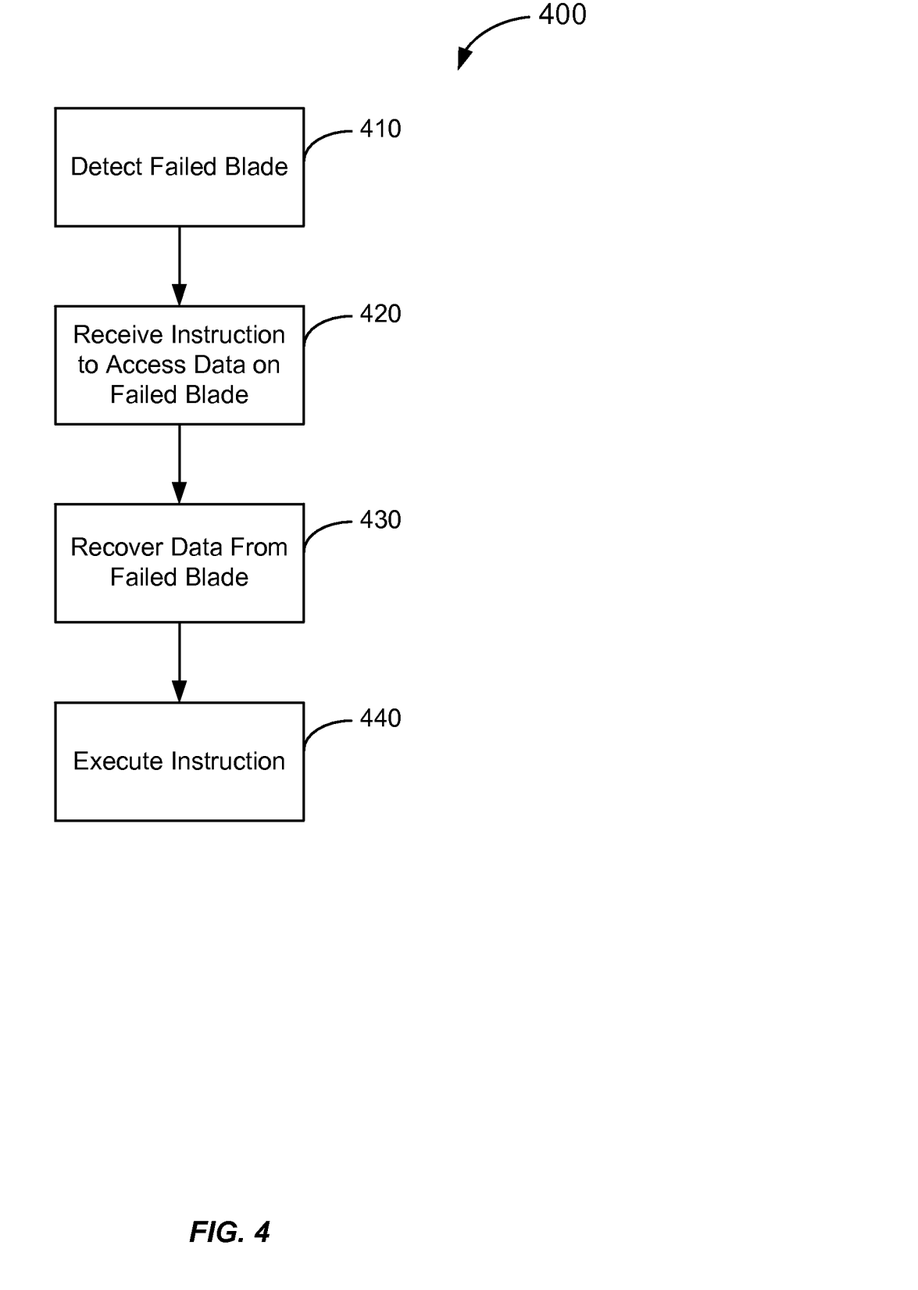
FIG. 4 is a flowchart diagram illustrating an implementation of a method of recovering data in a mass storage device.

FIG. 4 is a flowchart diagram illustrating an implementation of a method 400 of recovering data in a mass storage device, such as the mass storage device 100, where the data in the mass storage device has been previously written using, for example, the method illustrated in FIG. 3. The mass storage device implements RAID technology for recovery of multiple errors. The mass storage device may be, for example, used by multiple applications simultaneously for storing and retrieving data related to the operation of the applications.

In step 410, a failure of one of the blades of the mass storage device 100 is detected. The failure, for example, may be caused by a loss of power to the failed blade. Once the blade has failed, the data previously written to the blade is inaccessible. The blade is noted as being unavailable for writing and erasing.

In step 420, an instruction is received which requires accessing data which was stored on the failed blade. The instruction, for example, may be instructions to read data which was stored on the failed blade.

In step 430, data which was stored on the failed blade is recovered. To recover the data, the data may be regenerated using parity data as discussed above. The regenerated data may then be written to one of the operational blades using, for example, one or more aspects of the methods discussed above.

In step 440, the instruction is executed using the recovered data. For example, if the instruction is to read data which was stored on the failed blade, data corresponding to the data on the failed blade is read from the operational blade to which the recovered data was written.

In some implementations, aspects of the methods and systems described above can be used to implement additionally or alternatively other error recovery schemes. For example, in some implementations, ECC, RAID, and bad column mapping may be used, for example, by statically or dynamically changing schemes to optimize capacity and recovery capabilities for example, as a device ages. For example, a recovery scheme may be selected based at least in part on an indication of an age of a device.

While various embodiments of present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A mass storage device, comprising:
    a plurality of blades, wherein two of the blades are configured to exclusively store parity data and the other blades are configured to store data written to the device; and
        a controller configured to write data to the blades along stripes extending from the other blades to the two blades, and to write parity data to the two blades, wherein the parity data within a stripe is based on the data written to the other blades in the stripe, and wherein the parity data includes two types of parity data.

2. The mass storage device of claim 1, wherein the controller is configured to allocate storage of the blades to applications, wherein the allocation is thinly provisioned.

3. The mass storage device of claim 1, wherein the controller is configured to recover data of a failed blade in response to an operation to access the data of the failed blade.

4. The mass storage device of claim 1, wherein three or more of the blades are configured to store parity data and the other blades are configured to store data written to the device, and wherein the controller is configured to write data to the blades along stripes extending from the other blades to the three or more blades, and to write parity data to the three or more blades, wherein the parity data within a particular stripe is based on the data written to the other blades in the particular stripe, and wherein the parity data includes three or more types of parity data.

5. A method of writing data to a mass storage device comprising a plurality of blades, each blade comprising a plurality of pages, the method comprising:
    receiving data to be stored;
    writing data corresponding to the received data along a stripe of the mass storage device to a first subset of the blades;
    calculating first and second types of parity data, wherein the parity data is calculated based on the written data; and
    writing the first and second types of calculated parity data along the stripe to a second subset of the blades, wherein the second subset of blades is configured to exclusively store parity data.

6. The method of claim 5, wherein the first and second types of parity data are calculated in response to data of the received data being written to a last page of a last blade of the first subset.

7. The method of claim 5, wherein the second subset of blades comprises two blades.

8. The method of claim 5, further comprising:
    calculating a third type of parity data based on the written data; and
    writing the third type of calculated parity data along the stripe to the second subset of blades, wherein the second subset of blades comprises three or more blades.

9. A method of operating a mass storage device comprising a plurality of blades, the method comprising:
    configuring at least two blades to exclusively store parity data;
    configuring the other blades to store data written to the device;
    providing a controller configured to write data to the blades along stripes extending from the other blades to the at least two blades, and to write parity data to the at least two blades, wherein the parity data within a stripe is based on the data written to the other blades in the stripe, and wherein the parity data includes two types of parity data
    receiving an indication that one of the other blades has failed;
    receiving an instruction to access data located on the failed blade;
    recovering data of the failed blade; and
    executing the instruction using the recovered data.

10. The method of claim 9, wherein recovering the data of the failed blade comprises:
    retrieving data from the plurality of blades, the retrieved data comprising a plurality of data bits and a plurality of parity bits; and
    calculating the data of the failed blade based on the retrieved data and parity bits.

11. The method of claim 10, wherein the retrieved data bits and parity bits are retrieved from blades which have not failed, and are retrieved from stripes which include the data of the failed blade.

12. A method of operating a mass storage device comprising a plurality of blades and a controller, the method comprising:
   configuring at least two blades to exclusively store parity data;
   the controller operating the device with all of the blades;
   the controller receiving an indication that one of the blades has failed, based on parity data stored in the at least two blades configured to exclusively store parity data;
   the controller operating the device with the non-failing blades;
   the controller receiving an indication that the failed blade has been replaced; and
   the controller operating the device with all of the blades.

13. The method of claim 12, further comprising the controller allocating storage of the blades to applications, wherein the allocation is thinly provisioned.

14. The method of claim 12, further comprising the controller recovering data of the failed blade in response to an operation to access the data of the failed blade.

15. A method of operating a mass storage device comprising a plurality of blades, the method comprising:
   determining an age of the device; and
   selecting an error recovery method based on the age of the device, where in the
   selected error recovery method is selected from the group consisting of ECC, RAID, and bad column mapping.

16. The method of claim 15, further comprising:
   operating the device with all of the blades;
   receiving an indication that one of the blades has failed;
   receiving an instruction to access data located on the failed blade;
   recovering data of the failed blade based on the selected error recovery method; and
   executing the instruction using the recovered data.

17. A method of operating a mass storage device comprising a plurality of blades, the method comprising:
   configuring at least two blades to exclusively store parity data;
   operating the device with all of the blades;
   receiving an indication that one of the blades is at least partially unavailable, based on parity data stored in the at least two blades configured to exclusively store parity data;
   operating the device with the available blades; and
   recovering data of the unavailable blade based on data stored in the available blades.

18. The method of claim 17, further comprising:
   prior to receiving the indication, executing an operation which causes data of the at least partially unavailable blade to become unavailable.

19. The method of claim 18, wherein recovering the data of the unavailable blade comprises:
   retrieving data from the plurality of blades, the retrieved data comprising a plurality of data bits and a plurality of parity bits; and
   calculating the data of the unavailable blade based on the retrieved data and parity bits.

20. The method of claim 19, wherein the retrieved data bits and parity bits are retrieved from blades which are available, and are retrieved from stripes which include the data of the unavailable blade.

* * * * *